US012776122B2

(12) United States Patent
Wang et al.

(10) Patent No.: US 12,776,122 B2
(45) Date of Patent: Oct. 27, 2026

(54) IMAGE STYLE TRANSFER

(71) Applicant: BEIJING BAIDU NETCOM SCIENCE TECHNOLOGY CO., LTD., Beijing (CN)

(72) Inventors: Haoran Wang, Beijing (CN); Zeke Xie, Beijing (CN); Yunfeng Cai, Beijing (CN); Mingming Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 18/749,438

(22) Filed: Jun. 20, 2024

(65) Prior Publication Data

US 2025/0095250 A1 Mar. 20, 2025

(30) Foreign Application Priority Data

May 23, 2024 (CN) ........................ 202410649351.9

(51) Int. Cl.
*G06T 11/60* (2026.01)
*G06T 9/00* (2006.01)
*G06V 10/44* (2022.01)

(52) U.S. Cl.
CPC ................ *G06T 11/60* (2013.01); *G06T 9/00* (2013.01); *G06V 10/44* (2022.01)

(58) Field of Classification Search
CPC .. G06T 11/60; G06T 9/00; G06T 3/04; G06V 10/44; G06V 10/82; G06V 10/806; G06N 3/045; G06N 3/0475
See application file for complete search history.

(56) References Cited

U.S. PATENT DOCUMENTS

| | | | | |
|---|---|---|---|---|
| 12,524,937 | B2 * | 1/2026 | Park | G06T 11/60 |
| 2025/0329079 | A1 * | 10/2025 | Zhou | G06T 9/00 |
| 2025/0356171 | A1 * | 11/2025 | Choi | G06N 3/0475 |

FOREIGN PATENT DOCUMENTS

| | | | |
|---|---|---|---|
| JP | 2022107580 | A | 7/2022 |
| JP | 2023039889 | A | 3/2023 |

(Continued)

OTHER PUBLICATIONS

He, Feihong, et al., "FreeStyle: Free Lunch for Text-guided Style Transfer using Diffusion Models", Computer Vision and Pattern Recognition (cs.CV), arXiv:2401.15636 [cs.CV], version 1, published Jan. 28, 2024 (Year: 2024).*

(Continued)

*Primary Examiner* — William A Beutel
(74) *Attorney, Agent, or Firm* — Seed IP Law Group LLP

(57) ABSTRACT

A method is provided that includes: obtaining a reference image and a description text; extracting a text feature of the description text; and performing the following operations based on a pre-trained diffusion model to generate a target image: in each time step of the diffusion model: calculating a first cross-attention feature of a first image feature and the text feature; obtaining a second cross-attention feature of a second image feature of the reference image and the text feature; editing the first cross-attention feature based on the second cross-attention feature to obtain a third cross-attention feature; and generating a result image feature of the time step based on the third cross-attention feature and the text feature; and decoding a result image feature of a last time step to generate the target image.

17 Claims, 4 Drawing Sheets

(56) References Cited

FOREIGN PATENT DOCUMENTS

| | | | |
|---|---|---|---|
| WO | 2023160157 | A1 | 8/2023 |
| WO | 2023225344 | A1 | 11/2023 |

OTHER PUBLICATIONS

Datta, Siddhartha, et al., "Prompt Expansion for Adaptive Text-to-Image Generation", Computer Vision and Pattern Recognition, arXiv:2312.16720 [cs.CV], Dec. 27, 2023 (Year: 2023).*

* cited by examiner

IMAGE STYLE TRANSFER

CROSS-REFERENCE TO RELATED APPLICATIONS

This application claims priority to Chinese patent application No. 202410649351.9 filed on May 23, 2024, the contents of which are hereby incorporated by reference in their entirety for all purposes.

TECHNICAL FIELD

The present disclosure relates to the field of artificial intelligence technologies, in particular, to the technical fields such as deep learning and artificial intelligence generated content (AIGC), and specifically, to an image style transfer method, an electronic device, and a computer-readable storage medium.

BACKGROUND

Image style transfer refers to changing a style of an original image (that is, a reference image) while keeping content of the original image substantially unchanged, so as to obtain a new image (that is, a target image) having both the content of the original image and a new style. For example, the original image is a photo depicting a dog that is walking on the street (that is, in a photo style), and a specified new style is an anime style. Style transfer is performed on the original image, to obtain a new image depicting, in the anime style, a dog that is walking on the street.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, an image style transfer method is provided, including: obtaining a reference image and a description text, where the description text includes a content description text describing content of the reference image and a style description text describing a style of a target image to be generated; extracting a text feature of the description text; and performing the following operations based on a pre-trained diffusion model to generate the target image: in each time step of the diffusion model: calculating a first cross-attention feature of a first image feature and the text feature, where the first image feature in a first time step is an image feature of an initial image, and the first image feature in each of a second time step and subsequent time steps is a result image feature generated in a previous time step; obtaining a second cross-attention feature of a second image feature of the reference image and the text feature; editing the first cross-attention feature based on the second cross-attention feature to obtain a third cross-attention feature; and generating a result image feature of the time step based on the third cross-attention feature and the text feature; and decoding a result image feature of a last time step to generate the target image.

According to an aspect of the present disclosure, an electronic device is provided, including: a processor; and a memory communicatively connected to the processor, where the memory stores instructions executable by the processor, and the instructions, when executed by the processor, cause the processor to perform operations including: obtaining a reference image and a description text, where the description text includes a content description text describing content of the reference image and a style description text describing a style of a target image to be generated; extracting a text feature of the description text; and performing the following operations based on a pre-trained diffusion model to generate the target image: in each time step of the diffusion model: calculating a first cross-attention feature of a first image feature and the text feature, where the first image feature in a first time step is an image feature of an initial image, and the first image feature in each of a second time step and subsequent time steps is a result image feature generated in a previous time step; obtaining a second cross-attention feature of a second image feature of the reference image and the text feature; editing the first cross-attention feature based on the second cross-attention feature to obtain a third cross-attention feature; and generating a result image feature of the time step based on the third cross-attention feature and the text feature; and decoding a result image feature of a last time step to generate the target image.

According to an aspect of the present disclosure, a non-transitory computer-readable storage medium storing computer instructions is provided, where the computer instructions are configured to enable a computer to perform operations including: obtaining a reference image and a description text, where the description text includes a content description text describing content of the reference image and a style description text describing a style of a target image to be generated; extracting a text feature of the description text; and performing the following operations based on a pre-trained diffusion model to generate the target image: in each time step of the diffusion model: calculating a first cross-attention feature of a first image feature and the text feature, where the first image feature in a first time step is an image feature of an initial image, and the first image feature in each of a second time step and subsequent time steps is a result image feature generated in a previous time step; obtaining a second cross-attention feature of a second image feature of the reference image and the text feature; editing the first cross-attention feature based on the second cross-attention feature to obtain a third cross-attention feature; and generating a result image feature of the time step based on the third cross-attention feature and the text feature; and decoding a result image feature of a last time step to generate the target image.

BRIEF DESCRIPTION OF THE DRAWINGS

The drawings show the embodiments and constitute part of the specification, and are used to illustrate the implementations of the embodiments together with the text description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Figure 1:
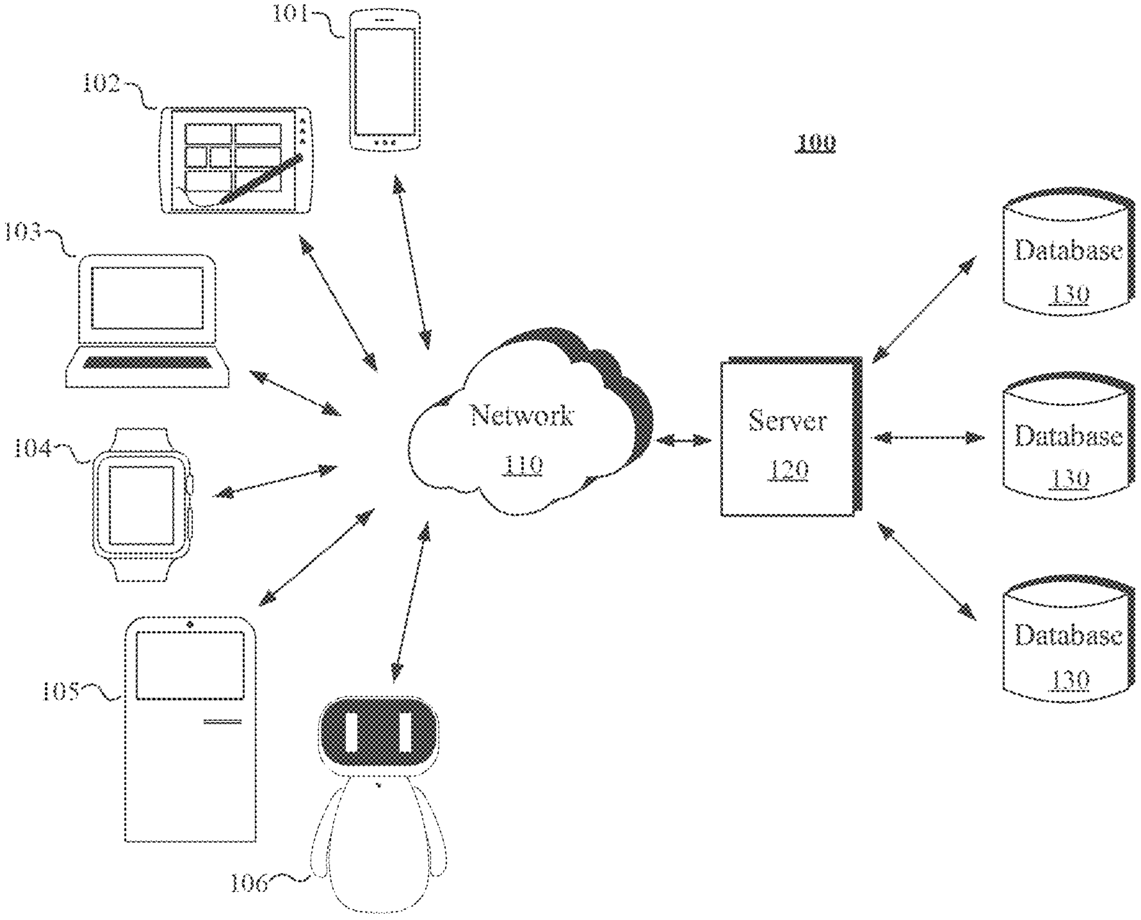
FIG. 1 is a schematic diagram of an example system in which various methods described herein can be implemented according to some embodiments of the present disclosure.

Some embodiments of the present disclosure are described below in conjunction with the accompanying drawings, where various details of the embodiments of the present disclosure are included to facilitate understanding, and should only be considered as examples. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc. used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms. "A plurality of" means two or more.

In the technical solutions of the present disclosure, obtaining, storage, application, etc. of personal information of a user all comply with related laws and regulations and are not against the public order and good morals.

Image style transfer refers to changing a style of an original image while keeping content of the original image substantially unchanged, so as to obtain a new image having both the content of the original image and a new style. Based on different quantities of images on which style transfer is to be performed, image style transfer tasks may be further classified into a style transfer task for a single image and a video style transfer task.

In the related art, image style transfer is usually implemented by using a fine-tuned diffusion model. That is, a pre-trained diffusion model is obtained first, and the diffusion model has a basic capability of generating an image from a text. Subsequently, the pre-trained diffusion model is fine-tuned by using a large amount of training data (that is, annotation data including a sample reference image, a sample style description text, and a sample target image) for an image style transfer task, and image style transfer is implemented by using the fine-tuned diffusion model. Specifically, noise is added to a reference image on which style transfer is to be performed, to obtain an initial image that is to be input into the diffusion model. The initial image and a style description text are input into the diffusion model, so that the diffusion model removes the noise from the initial image a plurality of times by using the style description text as a condition, so as to obtain a target image after style transfer.

In the related art above, to ensure a visual effect of the target image obtained after the transfer, fine tuning steps are necessary for the diffusion model. However, training (fine-tuning) the diffusion model is time-consuming and inefficient, and a style transfer effect of the diffusion model depends on the distribution of training data, which is prone to overfitting and poor generalization.

To solve the above problem, the present disclosure provides a non-training image style transfer method based on attention editing. A first cross-attention feature calculated in an image generation process of a diffusion model is edited by using a second cross-attention feature of an image feature of a reference image and a text feature, so that information in the reference image can be continuously introduced into the image generation process of the diffusion model. Therefore, the information in the reference image can be effectively used to guide image generation of the diffusion model, thereby ensuring that a generated target image can be consistent with the reference image in terms of content and has a specified style.

In the present disclosure, a commonly-used and pre-trained diffusion model can be used to implement high-quality image style transfer, and the diffusion model does not need to be further trained (fine-tuned) by using a large amount of annotation data, thereby improving the efficiency of image style transfer, reducing deployment and use costs of an image style transfer service, and having good generalization.

The embodiments of the present disclosure will be described below in detail with reference to the accompanying drawings.

FIG. 1 is a schematic diagram of a system 100 in which various methods and apparatuses described herein can be implemented according to an embodiment of the present disclosure.

Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more applications.

In an embodiment of the present disclosure, the client devices 101, 102, 103, 104, 105, and 106, and the server 120 may run one or more services or software applications that cause an image style transfer method to be performed.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. The user operating the client devices 101, 102, 103, 104, 105, and/or 106 may sequentially use one or more client applications to interact with the server 120, to use the services provided by these components. It should be understood that various different system configurations are possible, and may be different from that of the system 100.

Therefore, FIG. 1 is an example of the system for implementing various methods described herein, and is not intended to be limiting.

The client devices 101, 102, 103, 104, 105, and/or 106 may provide an interface that enables the user of the client device to interact with the client device. The client device may also output information to the user via the interface. Although FIG. 1 shows only six client devices, those skilled in the art can understand that any number of client devices are supported in the present disclosure.

The client devices 101, 102, 103, 104, 105, and/or 106 may include various types of computer devices, for example, a portable handheld device, a general-purpose computer (for example, a personal computer and a laptop computer), a workstation computer, a wearable device, a smart screen device, a self-service terminal device, a service robot, a vehicle-mounted device, a gaming system, a thin client, various messaging devices, and a sensor or other sensing devices. These computer devices can run various types and versions of software applications and operating systems, such as MICROSOFT Windows, APPLE IOS, a UNIX-like operating system, and a Linux or Linux-like operating system; or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or Wi-Fi), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that the various methods and apparatuses described according to the present disclosure can be applied.

According to some embodiments, the client devices 101 to 106 may obtain a reference image and a description text that are input by a user. The description text may include a content description text that describes the reference image, for example, "There is a dog that is walking on the street", and a style description text that describes a style of a target image to be generated, for example, "anime style". The client devices 101 to 106 send an image style transfer request to the server 120 based on the reference image and the description text that are input by the user. In response to the image style transfer request sent by the client devices 101 to 106, the server 120 performs the image style transfer method in the embodiments of the present disclosure, to generate a target image whose content is consistent with that of the reference image specified by the user and that has a specified style, and returns the generated target image to the client devices 101 to 106.

According to some embodiments, the client devices 101 to 106 may alternatively perform the image style transfer method in the embodiments of the present disclosure. Specifically, the client devices 101 to 106 may obtain a reference image and a description text that are input by a user, and perform the image style transfer method in the embodiments of the present disclosure based on the reference image and the description text, to generate a target image whose content is consistent with that of the reference image specified by the user and that has a specified style.

Figure 2:
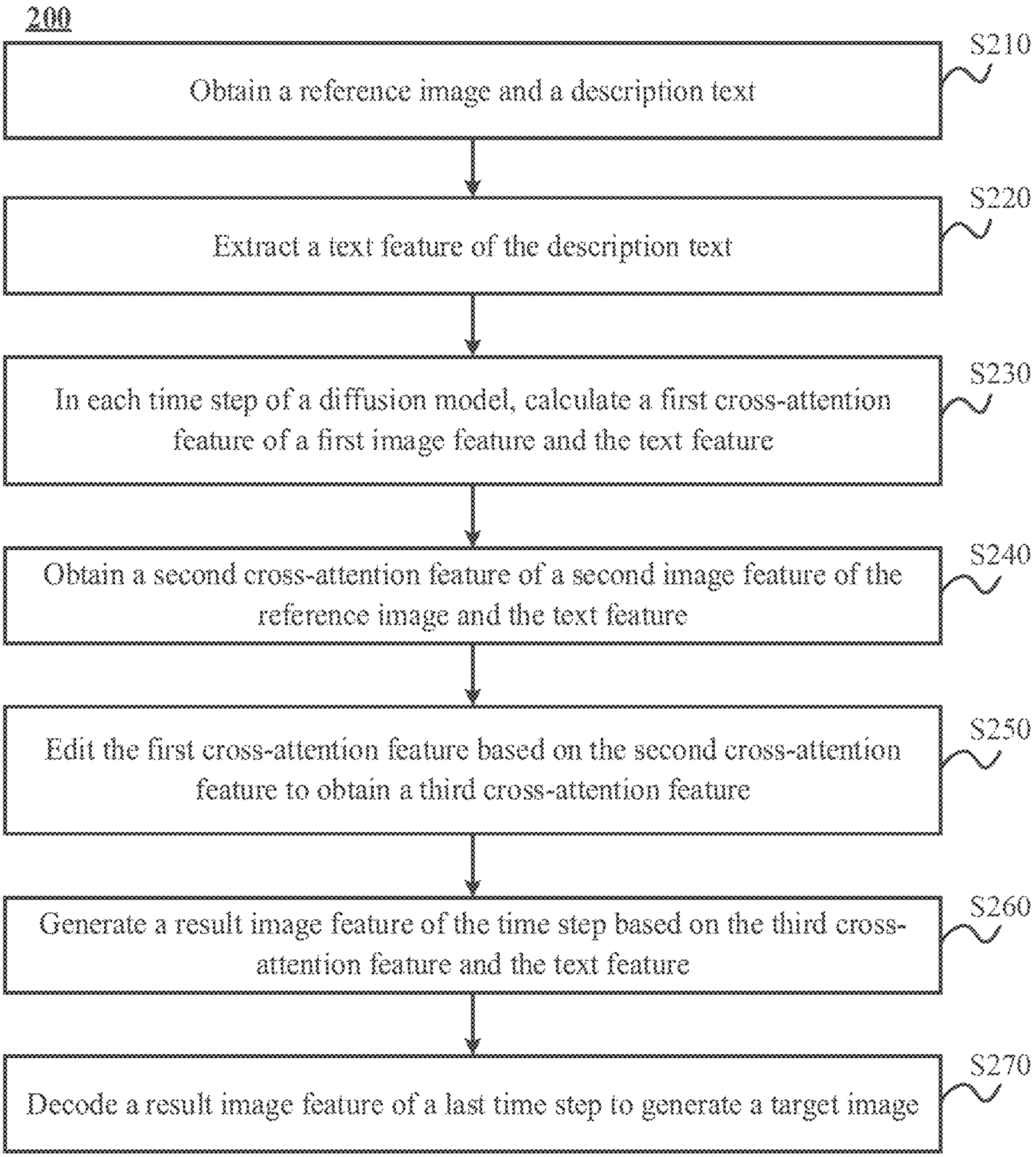
FIG. 2 is a flowchart of an image style transfer method according to some embodiments of the present disclosure.

FIG. 2 is a flowchart of an image style transfer method 200 according to an embodiment of the present disclosure. As described above, the method 200 may be performed by a client device, for example, the client devices 101 to 106 shown in FIG. 1; or may be performed by a server, for example, the server 120 shown in FIG. 1.

As shown in FIG. 2, the method 200 includes steps S210 to S270.

In step S210, a reference image and a description text are obtained. The description text includes a content description text that describes content of the reference image and a style description text that describes a style of a target image to be generated.

In step S220, a text feature of the description text is extracted.

Steps S230 to S270 are performed based on a pre-trained diffusion model to generate the target image.

In step S230, in each time step of the diffusion model, a first cross-attention feature of a first image feature and the text feature is calculated. A first image feature in a first time step is an image feature of an initial image, and a first image feature in each of a second time step and subsequent time steps is a result image feature generated in a previous time step.

In step S240, a second cross-attention feature of a second image feature of the reference image and the text feature is obtained.

In step S250, the first cross-attention feature is edited based on the second cross-attention feature to obtain a third cross-attention feature.

In step S260, a result image feature of the time step is generated based on the third cross-attention feature and the text feature.

In step S270, a result image feature of a last time step is decoded to generate the target image. The target image is consistent with the reference image in terms of content, and has the style indicated by the style description text.

According to this embodiment of the present disclosure, a non-training image style transfer method based on attention editing is provided. In this method, a first cross-attention feature calculated in an image generation process of a diffusion model is edited by using a second cross-attention feature of an image feature of a reference image and a text feature, so that information in the reference image can be continuously introduced into the image generation process of the diffusion model. Therefore, the information in the reference image can be effectively used to guide image generation of the diffusion model, thereby ensuring that a generated target image can be consistent with the reference image in terms of content and has a specified style.

In the present disclosure, a commonly-used and pre-trained diffusion model can be used to implement high-quality image style transfer, and the diffusion model does not need to be further trained (fine-tuned) by using a large amount of annotation data, thereby improving the efficiency of image style transfer, reducing deployment and use costs of an image style transfer service, and having good generalization.

Each step of the method 200 is described in detail below.

In step S210, a reference image and a description text are obtained.

The reference image may be input by a user. According to some embodiments, the user may input a single image as the reference image. According to some other embodiments, the user may input a reference video, and accordingly, the reference image may be any image frame in the reference video.

The description text further includes a content description text and a style description text.

The content description text is used to describe content of the reference image. According to some embodiments, the content description text may be input by the user. For example, the user may specify the reference image and input a content description text "There is a dog that is walking on the street" of the reference image.

According to some other embodiments, the content description text may alternatively be automatically generated based on the reference image. For example, the reference image specified by the user is input into a trained image understanding model, to obtain a content description text that is of the reference image and that is output by the image understanding model. The image understanding model may be, for example, a large language model or a neural network model including an image encoder and a text decoder.

The style description text is used to describe a new style to which the reference image is to be migrated, that is, a style that describes a target image to be generated, for example, a photo style, an anime style, a sketch style, or an ink wash painting style. The style description text may be input by the user.

In step S220, a text feature of the description text is extracted.

According to some embodiments, the entire description text may be input into a trained text encoder to obtain a text feature that is of the description text and that is output by the text encoder. The text encoder may be, for example, a Contrastive Language-Image Pretraining (CLIP) text encoder, a Bidirectional Encoder Representations from Transformers (BERT) model, or a word2vec model. Generally, the text encoder divides the description text into a plurality of tokens, and encodes each token to obtain a feature vector of each token. Feature vectors of the tokens are spliced to obtain the text feature of the description text.

It may be understood that, because the description text includes two parts: the content description text and the style description text, accordingly, the text feature of the description text also includes two parts, that is, the text feature of the description text includes a first text feature of the content description text and a second text feature of the style description text. The first text feature includes a feature vector of each token in the content description text. The second text feature includes a feature vector of each token in the style description text.

According to some embodiments, step S220 may include steps S221 to S223.

In step S221, the content description text is encoded to obtain the first text feature of the content description text.

In step S222, information of the reference image is introduced into the style description text to obtain an extended style description text.

In step S223, the extended style description text is encoded to obtain a second text feature of the extended style description text. The text feature of the description text includes the first text feature and the second text feature.

According to the foregoing embodiment, the content description text and the style description text are separately encoded, and the information in the reference image is introduced into the style description text. Therefore, it can be convenient to separately control a degree of retaining content of the reference image and a degree of applying a new style in a style transfer process, so that the style transfer process is more controllable and smoother.

According to some embodiments, in step S221, the content description text may be input into the text encoder to obtain the first text feature that is of the content description text and that is output by the text encoder. It may be understood that the first text feature includes a feature vector of each token in the content description text.

According to some embodiments, in step S222, a style description identifier of the reference image may be obtained, and the style description identifier of the reference image indicates a style of the reference image. The original style description text and the style description identifier of the reference image are spliced to obtain the extended style description text. That is, the extended style description text includes the original style description text and the style description identifier of the reference image.

According to some embodiments, the style description identifier of the reference image may be an existing token in a lexicon, such as "photo" or "sketch". In this case, the style description identifier of the reference image may be recognized by using a trained style recognition model. Specifically, the reference image is input into the style recognition model, to obtain a style type that is of the reference image and that is output by the style recognition model. The style recognition model may be, for example, a convolutional neural network.

Corresponding to the case that the style description identifier is an existing token in the lexicon, step S223 may include: inputting the extended style description text into the text encoder to obtain the second text feature that is of the extended style description text and that is output by the text encoder. It may be understood that the second text feature includes a feature vector of each token in the extended style description text.

According to some embodiments, the style description identifier of the reference image may be a visual identifier that has never appeared in the lexicon, and may be represented as, for example, [S*]. Because the visual identifier has never appeared in the lexicon, a feature vector of the visual identifier cannot be obtained by using the text encoder.

Corresponding to the case that the style description identifier is a visual identifier that has never appeared in the lexicon, step S223 may include steps S2231 to S2233.

In step S2231, a first text sub-feature of the style description text is extracted by using the text encoder.

In step S2232, a third image feature of the reference image is extracted by using the image encoder. The image encoder and the text encoder are respectively configured to map an image and a text to a same feature space.

In step S2233, the third image feature is determined as a second text sub-feature of the style description identifier. The second text feature of the extended style description text includes the first text sub-feature and the second text sub-feature.

According to the above embodiment, text information and image information in the extended style description text are respectively encoded by using the text encoder and the image encoder that are cross-modal, so that a cross-modal feature can be accurately extracted, thereby accurately expressing a visual style feature of the reference image and improving the accuracy of style transfer.

According to some embodiments, the text encoder in step S2231 may be a CLIP text encoder, and the image encoder in step S2232 may be a CLIP image encoder. The CLIP text encoder and the CLIP image encoder may map a text and an image to a same feature space, so that cross-modal and uniform feature representation is implemented.

According to some embodiments, when the reference image is an independent image without context, in step S2232, the reference image may be input into the image encoder to obtain the third image feature output by the image encoder.

According to some embodiments, when the reference image is any image frame in a reference video, in step S2232, image features of one or more image frames in the reference video may be extracted as the third image feature of the reference image by using the image encoder. For example, the first image frame in the reference video may be input into the image encoder to obtain an image feature of the image frame output by the image encoder. When each image frame in the reference video is used as the reference image for style transfer, an image feature of the first image frame in the reference video is used as the third image feature of the reference image.

According to the above embodiment, image frames in a same reference video may reuse a same third image feature, thereby avoiding repeated calculation of the third image feature, and helping improve the consistency of style transfer of the image frames in a video style transfer task.

In the embodiments of the present disclosure, the target image is generated by using a pre-trained diffusion model. The target image is consistent with the reference image in terms of content, and has the style indicated by the style description text.

In the embodiments of the present disclosure, the pre-trained diffusion model has a basic capability of generating an image from a text, but is not fine-tuned for an image style transfer task.

The pre-trained diffusion model performs a denoising operation (that is, a reverse diffusion operation) on an initial image for a plurality of times by using the text feature as a condition, to finally obtain the target image. Each denoising operation of the diffusion model corresponds to one time step.

The pre-trained diffusion model includes a cross-attention layer. An image generation process of the diffusion model is as follows: In each time step t (t=T, T−1, T−2, . . . , 2, 1, where T is an integer greater than 1, such as 50 or 100, and a value of T may be set manually or by a machine), in the cross-attention layer, a currently generated first image feature $I_t$ and a text feature Text of the description text are used as an input, a first cross-attention feature $M_t$*(that is, a first attention weight map, attention map) of the first image feature $I_t$ and the text feature Text is calculated by using a cross-attention mechanism, and a result image feature $O_t$ of this time step is further generated based on the first cross-attention feature $M_t$ and the text feature Text. A result image feature $O_1$ of the last time step (t=1) is decoded to generate the target image.

It should be noted that for the first time step t=T, a first image feature $I_T$ is an image feature of an initial image. The initial image may be, for example, a random noise image, or an image obtained by adding noise to the reference image. For each of the second time step and subsequent time steps t, the first image feature $I_t$ is a result image feature $O_{t+1}$ generated in a previous time step (t+1).

In the embodiments of the present disclosure, an attention editing mechanism is introduced based on the pre-trained diffusion model, so that high-quality image style transfer is implemented while the diffusion model does not need to be further fine-tuned. Specifically, the first cross-attention feature $M_t$*calculated in an image generation process of the diffusion model is edited by using a second cross-attention feature $M_t$ of the image feature of the reference image and the text feature, so that information in the reference image can be continuously introduced into the image generation process of the diffusion model, thereby effectively using the information in the reference image to guide image generation of the diffusion model, and ensuring that the generated target image can be consistent with the reference image in terms of content and has a specified style.

Steps S230 to S270 describe a process of generating the target image after the attention editing mechanism is introduced into the pre-trained diffusion generation model.

In step S230, in each time step t (t=T, T−1, T−2, . . . , 2, 1, where T is an integer greater than 1, such as 50 or 100, and a value of T may be set manually or by a machine) of the diffusion model, the first cross-attention feature Me of the first image feature $I_t$ and the text feature Text is calculated. A first image feature $I_T$ of the first time step t=T is an image feature of an initial image. The initial image may be, for example, a random noise image, or an image obtained by adding noise to the reference image. The image feature of the initial image may be extracted by the image encoder (for example, a CLIP image encoder). A first image feature $I_t$ in each of the second time step and subsequent time steps t=T−1, T−2, . . . , 2, 1 is a result image feature $O_{t+1}$ generated in a previous time step t+1.

As described above, the diffusion model includes the cross-attention layer. The cross-attention layer includes three parameters: a query transformation matrix $W^Q$, a key transformation matrix $W^K$, and a value transformation matrix $W^V$.

The cross-attention layer uses the first image feature $I_t$ and the text feature Text of the description text as an input. The first image feature $I_t$ is linearly transformed by using the query transformation matrix $W^Q$ to obtain a query matrix $Q_t = I_t \cdot W^Q$. The text feature Text is linearly transformed by using the key transformation matrix $W^K$ and the value transformation matrix $W^V$, to obtain a key matrix $K_t = \text{Text} \cdot W^K$ and a value matrix $V_t = \text{Text} \cdot W^V$. The first cross-attention feature $M_t$*is calculated based on the following formula (1):

$$M_t^* = \text{softmax}\left(\frac{Q_t K_t^T}{\sqrt{d_{K_t}}}\right) \tag{1}$$

In the above formula, $d_{K_t}$ is a quantity of rows or a quantity of columns in the key matrix $K_t$, and represents a length of each vector in the key matrix $K_t$. It may be understood that the first cross-attention feature $M_t$*is essentially an attention weight map (attention map), and an element whose coordinates in the weight map are (i, j) indicates a degree of correlation between a feature location i (corresponding to a pixel i in a current image) in the first image feature $I_t$ and a feature location j (corresponding to a $j^{th}$ token in the description text) in the text feature Text.

According to some embodiments, the diffusion model may further include a self-attention layer. An output end of the self-attention layer may be connected to an input end of the cross-attention layer. Accordingly, step S230 may include steps S231 to S233.

In step S231, a self-attention feature of the first image feature is calculated.

In step S232, a fourth image feature is generated based on the self-attention feature and the first image feature.

In step S233, a first cross-attention feature of the fourth image feature and the text feature is calculated.

According to the above embodiment, information inside the first image feature is aggregated by using a self-attention mechanism, so that the correlation between pixels can be captured, and therefore, the aggregated first image feature (that is, the fourth image feature) can more accurately express information in the generated image. The first cross-attention feature is calculated by using the fourth image feature, so that the first cross-attention feature can accurately express the information in the generated image, thereby improving quality of the generated target image.

In the above step S231, a self-attention feature $M_{s,t}$ of the first image feature $I_t$ may be calculated by using the self-attention layer. Specifically, the self-attention layer has three parameters: a query transformation matrix $W_s^Q$, a key transformation matrix $W_s^K$, and a value transformation matrix $W_s^V$. The first image feature $I_t$ is linearly transformed separately by using the query transformation matrix $W_s^Q$, the key transformation matrix $W^K$, and the value transformation matrix $W_s^V$, to obtain a query matrix $Q_{s,t} = I_t \cdot W_s^Q$, a key matrix $K_{s,t} = I_t \cdot W_s^K$, and a value matrix $V_{s,t} = I_t \cdot W_s^V$. The self-attention feature $M_{s,t}$ is calculated based on the following formula (2):

$$M_{s,t} = \text{softmax}\left(\frac{Q_{s,t} K_{s,t}^T}{\sqrt{d_{K_{s,t}}}}\right) \tag{2}$$

In the above formula, $d_{K_{s,t}}$ is a quantity of rows or a quantity of columns in the key matrix $K_{s,t}$, and represents a length of each vector in the key matrix $K_{s,t}$. It may be understood that the self-attention feature $M_{s,t}$ is essentially an attention weight map (attention map), and an element whose coordinates in the weight map are (i, j) indicates a degree of correlation between a feature location i (corresponding to a pixel i in a current image) and a feature location j (corresponding to a pixel j in the current image) in the first image feature $I_t$.

In step S232, the self-attention feature $M_{s,t}$ is multiplied by the value matrix $V_{s,t}$ calculated based on the first image feature $I_t$, to obtain the fourth image feature $I_{s,t}$, that is, an updated first image feature. That is, in this embodiment, the fourth image feature $I_{s,t}$ is calculated based on the following formula (3):

$$I_{s,t} = M_{s,t} \cdot V_{s,t} \tag{3}$$

According to some embodiments, in the video style transfer task, each image frame in the reference video is used as the reference image for style transfer. When the reference image is any image frame in the reference video except the first image frame, there are one or more image frames before the reference image, and these image frames are denoted as historical image frames of the reference image. Accordingly, step S232 may include steps S2321 and S2322.

In step S2321, based on a historical self-attention feature corresponding to the self-attention feature $M_{s,t}$, the self-attention feature $M_{s,t}$ is adjusted, to obtain an adjusted self-attention feature $M_{s,t}'$. The historical self-attention feature is an attention feature that is obtained by performing style transfer on the historical image frame of the reference image by using the diffusion model and that is located at a same location as the self-attention feature $M_{s,t}$.

In step S2322, the fourth image feature $I_{s,t}$ is generated based on the adjusted self-attention feature $M_{s,t}'$ and the first image feature $I_t$. The fourth image feature $I_{s,t}$ may be calculated based on the following formula (4):

$$I_{s,t} = M'_{s,t} \cdot V_{s,t} \tag{4}$$

According to the above embodiment, for the video style transfer task, association between image frames can be established, so that image frames generated after style transfer have good temporal consistency.

For the above step S2321, it may be understood that each historical image frame corresponds to one historical self-attention feature. When there are a plurality of historical image frames, a plurality of historical self-attention features may be obtained.

According to some embodiments, an average value of the self-attention feature $M_{s,t}$ and historical self-attention features may be used as the adjusted self-attention feature $M_{s,t}'$.

According to some other embodiments, a weighted sum of the self-attention feature $M_{s,t}$ and historical self-attention features may be used as the adjusted self-attention feature $M_{s,t}'$. A weight of each historical self-attention feature may be negatively correlated with a distance from a corresponding historical image frame to the reference image, that is, a shorter (smaller) distance from a historical image frame to the reference image indicates a larger weight of a historical self-attention feature corresponding to the historical image frame.

In step S233, a cross-attention feature of the fourth image feature $I_{s,t}$ and the text feature Text is calculated by using the cross-attention layer, and is used as the above first cross-attention feature $M_t$*. Specifically, a manner of calculating the cross-attention feature of the fourth image feature $I_{s,t}$ and the text feature Text is the same as the above manner of calculating the cross-attention feature of the first image feature $I_t$ and the text feature Text, except that the first image feature $I_t$ in the above calculation process (refer to the above formula (1)) is replaced with the fourth image feature $I_{s,t}$.

In step S240, a second cross-attention feature of a second image feature of the reference image and the text feature is obtained.

The second image feature F of the reference image may be extracted by using the image encoder (for example, a CLIP image encoder).

The second cross-attention feature $M_t$ of the second image feature F of the reference image and the text feature Text may also be obtained by using the cross-attention layer of the diffusion model. Specifically, the second image feature F is linearly transformed by using the query transformation matrix $W^{\circ}$ to obtain a query matrix $Q=F \cdot W^Q$. The text feature Text is linearly transformed separately by using the key transformation matrix $W^K$ and the value transformation matrix $W^V$ to obtain a key matrix $K=\text{Text} \cdot W^K$ and a value matrix $V=\text{Text} \cdot W^V$. It may be understood that K is the same as $K_t$ in the above description, and V is the same as $V_t$ in the above description. The second cross-attention feature $M_t$ is calculated based on the following formula (5):

$$M_t = \mathrm{softmax}\left(\frac{QK_{\square}^{T}}{\sqrt{d_K}}\right) \tag{5}$$

In the above formula, $d_{K_t}$ is a quantity of rows or a quantity of columns in the key matrix K (that is, $K_t$), and represents a length of each vector in the key matrix K (that is, $K_t$). It may be understood that the second cross-attention feature $M_t$ is also essentially an attention weight map, and an element whose coordinates in the weight map are (i, j) indicates a degree of correlation between a feature location i (corresponding to a pixel i in the reference image) in the second image feature F and a feature location j (corresponding to a $j^{th}$ token in the description text) in the text feature Text.

In step S250, the first cross-attention feature is edited based on the second cross-attention feature to obtain a third cross-attention feature. It may be understood that the third cross-attention feature is an edited first cross-attention feature.

As described above, the text feature of the description text includes two parts: the first text feature of the content description text and the second text feature of the style description text. Accordingly, the first cross-attention feature, the second cross-attention feature, and the third cross-attention feature may each be divided into two sub-features, where one sub-feature corresponds to the content description text, and the other sub-feature corresponds to the style description text. Specifically, the first cross-attention feature includes a first content sub-feature corresponding to the content description text and a first style sub-feature corresponding to the style description text. The second cross-attention feature includes a second content sub-feature corresponding to the content description text and a second style sub-feature corresponding to the style description text. The third cross-attention feature includes a third content sub-feature corresponding to the content description text and a third style sub-feature corresponding to the style description text.

Corresponding to the above embodiment of division into sub-features, step S250 may further include steps S251 and S252.

In step S251, the first content sub-feature is modified based on the second content sub-feature to obtain the third content sub-feature.

In step S252, the third style sub-feature is determined based on the first style sub-feature.

According to the above embodiment, the content sub-feature and the style sub-feature are separately edited, so that the reference image mainly affects the content of the target image, and does not excessively affect application of the new style.

The content of the target image is limited by the content of the reference image. According to some embodiments, in step S251, the first content sub-feature is replaced with a product of the second content sub-feature and a first factor. That is, the third content sub-feature is the product of the second content sub-feature and the first factor. The first factor indicates a consistency degree between the content of the target image and the content of the reference image, that is, indicates strength of retaining the content of the reference image.

According to some embodiments, the first factor is a positive number, and therefore, a value of the first factor is positively correlated with the strength of retaining the content of the reference image. The strength of retaining the content of the reference image in the style transfer process can be controlled by adjusting the value of the first factor. Specifically, a larger value of the first factor leads to greater strength of retaining the content of the reference image and a greater consistency degree between the content of the target image and the content of the reference image; and a smaller value of the first factor leads to lower strength of retaining the content of the reference image and a lower consistency degree between the content of the target image and the content of the reference image.

According to some embodiments, in step S251, a weighted sum of the first content sub-feature and the second content sub-feature may be used as the third content sub-feature. A weight of the second content sub-feature can indicate the consistency degree between the content of the target image and the content of the reference image, that is, indicate the degree of retaining the content of the reference image. The degree of retaining the content of the reference image in the style transfer process can be controlled by adjusting the weight of the second content sub-feature.

The style of the target image is limited by the style description text, and is less affected by the reference image. Therefore, according to some embodiments, in step S252, the third style sub-feature may be determined based only on the first style sub-feature. It should be noted that, when the information in the reference image is introduced into the style description text by using the above step S222, the extended style description text also includes the information in the reference image. Therefore, if the third style sub-feature is determined based only on the first style sub-feature, the style of the target image can still be guided by the information in the reference image, so that smooth style transfer is performed on the target image relative to the reference image without causing an abrupt style change.

According to some embodiments, in step S252, a product of the first style sub-feature and a second factor may be used as the third style sub-feature. The second factor indicates the degree of applying the new style (that is, a style indicated by the style description text).

According to some embodiments, the second factor is a positive number, and therefore, a value of the second factor is positively correlated with the degree of applying the new style. The degree of applying the new style in the style transfer process can be controlled by adjusting the value of the second factor. Specifically, a larger value of the second factor leads to a greater degree of applying the new style, and a smaller value of the second factor leads to a lower degree of applying the new style.

According to some embodiments, an attention editing process of step S250 may be represented by the following formula (6):

$$M_t^{**} = \mathrm{Edit}(M_t, M_t^*, t)_{i,j} = \begin{cases} \alpha(M_t)_{i,j} & j \text{ is a token in } X \\ \beta(M_t^*)_{i,j} & j \text{ is a token in } Y^* \end{cases} \quad (6)$$

In the above formula, $M_t^*$, $M_t$, and $M_t^{**}$ are respectively a first cross-attention feature, a second cross-attention feature, and a third cross-attention feature in a $t^{th}$ time step. Edit ( ) is an attention editing function. i and j respectively represent feature locations in the cross-attention feature and the text feature. α and β are respectively the first factor and the second factor. In the image style transfer task, values of α and β may be customized by the user.

In step S260, a result image feature of the time step is generated based on the third cross-attention feature and the text feature.

According to some embodiments, in step S260, the third attention feature $M_t^{**}$ is multiplied by the value matrix $V_t$ calculated based on the text feature, to obtain a result image feature $O_t$. In this embodiment, the result image feature $O_t$ is calculated based on the following formula (7):

$$O_t = M_t^{**} \cdot V_t \quad (7)$$

According to some embodiments, in step S260, the third attention feature $M_t^{**}$ is multiplied by the value matrix $V_t$ calculated based on the text feature, to obtain a noise image feature $N_t$. A difference between the currently generated first image feature $I_t$ and the noise image feature $N_t$ is calculated, to obtain the result image feature $O_t$. In this embodiment, the result image feature $O_t$ is calculated based on the following formulas (8) and (9):

$$N_t = M_t^{**} \cdot V_t \quad (8)$$

$$O_t = I_t - N_t \quad (9)$$

It should be noted that a specific calculation manner of the result image feature $O_t$ depends on a type of the diffusion model. If the diffusion model directly predicts a result image of each time step, the result image feature is calculated by using the above formula (7). If the diffusion model predicts noise of each time step, the result image feature is calculated by using the above formulas (8) and (9).

In step S270, a result image feature of the last time step is decoded to generate the target image. The target image is consistent with the reference image in terms of content, and has the style indicated by the style description text.

According to some embodiments, the pre-trained diffusion model may include a decoder. The decoder is used to decode the result image feature of the last time step, to obtain the style-migrated target image. The target image is consistent with the reference image in terms of content, and has the style indicated by the style description text.

Figure 3:
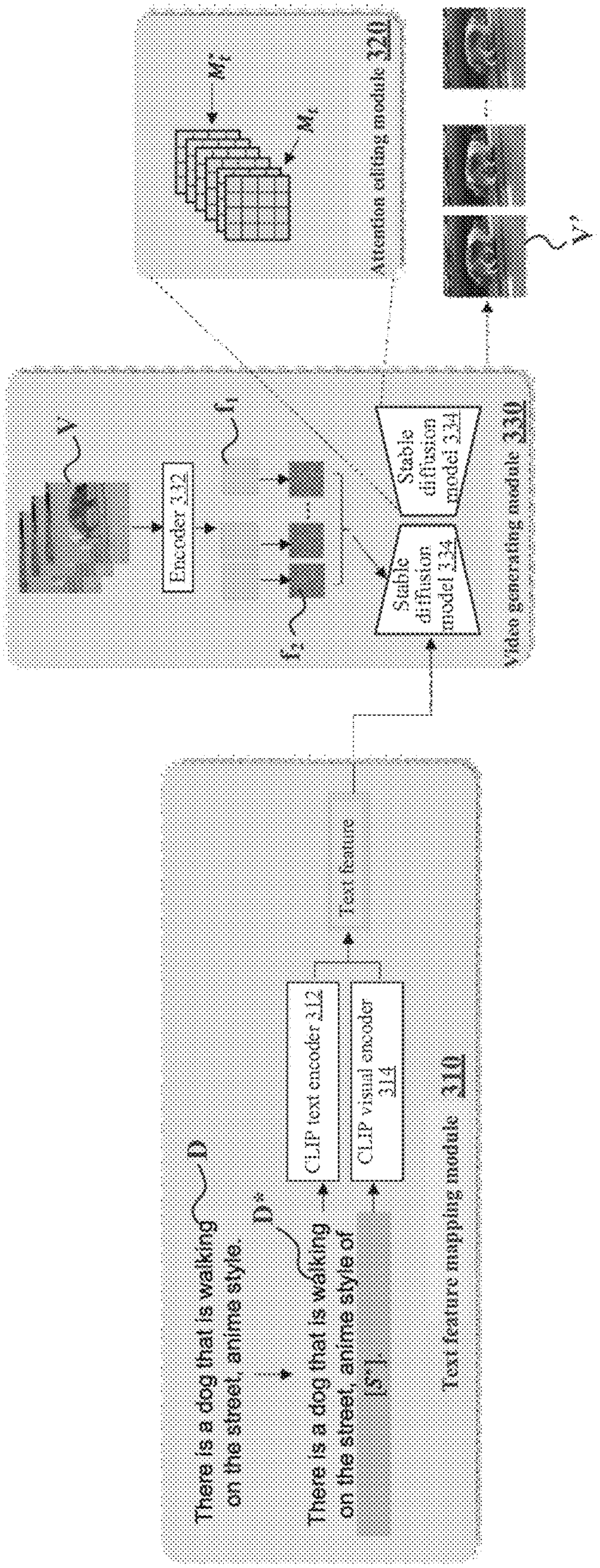
FIG. 3 is a schematic diagram of a video style transfer process according to some embodiments of the present disclosure.

FIG. 3 is a schematic diagram of a video style transfer process according to an embodiment of the present disclosure. The video style transfer process is implemented by a video style transfer service. As shown in FIG. 3, the video style transfer service includes a text feature mapping module 310, an attention editing module 320, and a video generating module 330.

The text feature mapping module 310 obtains a description text D="X, Y" provided by a user, where X is a content description text used to describe content of a reference video V, and Y is a style description text used to describe a style of a target video to be generated. As shown in FIG. 3, the content description text X="There is a dog that is walking on the street", and the style description text Y="anime style".

To retain more content features of the reference video V, content information of the reference video V is introduced into the description text D, and the description text D is updated to D*="X, Y*", where Y*="Y of [S*]"="anime style of [S*]", and [S*] is a style description identifier of the reference video V.

The text feature mapping module 310 encodes the updated description text D* by using a pre-trained CLIP model to obtain a text feature of D*. Specifically, for natural language tokens in D*, that is, X and the "anime style of" part in Y*, a text encoder 312 in the CLIP model is used to extract their text feature. The style description identifier [S*] is a token that has never appeared in a lexicon, and a visual feature of a first frame in the reference video V is extracted by using a visual encoder (that is, an image encoder) 314 in the CLIP model. Because the CLIP model can map the visual feature and the text feature to a same feature space, the feature is used as a text feature corresponding to the style description identifier [S*]. Subsequently, the two parts of features are spliced to obtain a complete text feature of the description text D*.

The attention editing module 320 edits a cross-attention mechanism between the reference video V and the description text by using the text feature of the description text D* and the reference video V as an input, to obtain a new attention feature in a video generation process during style transfer, and introduces the new attention feature into an inference process of a pre-trained basic model, that is, a stable diffusion model 334.

In a $t^{th}$ time step of the inference process, a cross-attention feature $M_t$*of a feature code of a currently generated video frame and the text feature of D* is calculated, and a cross-attention feature $M_t$ of a feature code of the reference video V and the text feature of the content description text X of the reference video V is obtained. Edit $(M_t, M_t^*, t)_{i,j}$ represents an editing function of a cross-attention mechanism of a video frame feature location i and a token text feature location j of D*.

In a process of generating the video, when calculating the cross-attention feature $M_t$* of the feature code of the generated video frame and the text feature of D*, the attention editing module 320 replaces an attention feature part, in $M_t$*, of the feature code of the generated video frame and the text feature of X with the cross-attention feature of the feature code of the reference video V and the text feature of X, that is:

$$\mathrm{Edit}(M_t, M_t^*, t)_{i,j} = \begin{cases} \alpha(M_t)_{i,j} & j \text{ is a token in } X \\ \beta(M_t^*)_{i,j} & j \text{ is a token in } Y^* \end{cases} \tag{10}$$

α and β are strength parameters in an attention editing process (respectively corresponding to the first factor and the second factor in the above description). α is used to adjust strength of retaining content of the reference video, and larger α leads to greater strength of retaining the reference video. β is used to adjust a degree of adjusting a new style, and greater β leads to a greater degree of applying the new style. Values of α and β are independent of each other, and both may be customized by the user.

The video generating module 330 generates a style-migrated video V' based on the stable diffusion model 334. The video generating module 330 encodes the reference video V by using the encoder 332 to obtain a feature code $f_1$ of the reference video V. The encoder 332 may be, for example, a CLIP visual encoder. Noise (for example, random noise that conforms to Gaussian distribution) is added to the feature code f1, to obtain a feature code $f_2$. The feature code $f_2$ is used as an initial image feature of the stable diffusion model 334, that is, a start point of a reverse diffusion operation.

In a process of generating each video frame, an original cross-attention feature calculated in the stable diffusion model 334 is replaced with the edited cross-attention feature. In addition, an original self-attention feature calculated in the stable diffusion model 334 is replaced with a self-attention feature of a historical video frame, to establish association between video frames, so that the generated video has better performance in terms of temporal consistency.

The video style transfer process shown in FIG. 3 has the following advantages:

1. There is no need to use a large amount of data for model training, thereby reducing service deployment and use costs.
2. The user can customize stylization strength α and β.
3. The generated style-migrated video has better temporal consistency.

Figure 4:
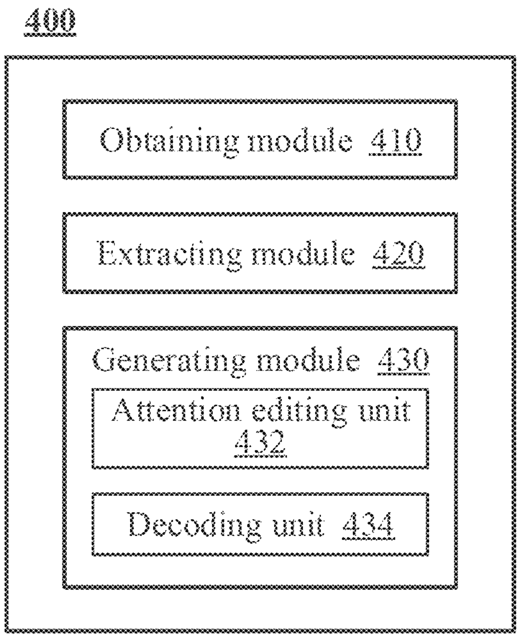
FIG. 4 is a block diagram of a structure of an image style transfer apparatus according to some embodiments of the present disclosure.

According to an embodiment of the present disclosure, an image style transfer apparatus is further provided. FIG. 4 is a block diagram of a structure of an image style transfer apparatus 400 according to an embodiment of the present disclosure. As shown in FIG. 4, the apparatus 400 includes an obtaining module 410, an extracting module 420, and a generating module 430.

The obtaining module 410 is configured to obtain a reference image and a description text, where the description text includes a content description text that describes content of the reference image and a style description text that describes a style of a target image to be generated.

The extracting module 420 is configured to extract a text feature of the description text.

The generating module 430 is configured to generate the target image based on a pre-trained diffusion model. The generating module 430 further includes an attention editing unit 432 and a decoding unit 434.

The attention editing unit 432 is configured to: in each time step of the diffusion model: calculate a first cross-attention feature of a first image feature and the text feature, where the first image feature in the first time step is an image feature of an initial image, and the first image feature in each of the second time step and subsequent time steps is a result image feature generated in a previous time step; obtain a second cross-attention feature of a second image feature of the reference image and the text feature; edit the first cross-attention feature based on the second cross-attention feature to obtain a third cross-attention feature; and generate a result image feature of the time step based on the third cross-attention feature and the text feature.

The decoding unit 434 is configured to decode a result image feature of the last time step to generate the target image.

According to this embodiment of the present disclosure, a non-training image style transfer apparatus based on attention editing is provided. In this apparatus, a first cross-attention feature calculated in an image generation process of a diffusion model is edited by using a second cross-attention feature of an image feature of a reference image and a text feature, so that information in the reference image can be continuously introduced into the image generation process of the diffusion model. Therefore, the information in the reference image can be effectively used to guide image generation of the diffusion model, thereby ensuring that a generated target image can be consistent with the reference image in terms of content and has a specified style.

In the present disclosure, a commonly-used and pre-trained diffusion model can be used to implement high-quality image style transfer, and the diffusion model does not need to be further trained (fine-tuned) by using a large amount of annotation data, thereby improving the efficiency of image style transfer, reducing deployment and use costs of an image style transfer service, and having good generalization.

According to some embodiments, the first cross-attention feature includes a first content sub-feature corresponding to the content description text and a first style sub-feature corresponding to the style description text, the second cross-attention feature includes a second content sub-feature corresponding to the content description text and a second style sub-feature corresponding to the style description text, the third cross-attention feature includes a third content sub-feature corresponding to the content description text and a third style sub-feature corresponding to the style description text, and the attention editing unit includes: a content editing subunit, configured to modify the first content sub-feature based on the second content sub-feature to obtain the third content sub-feature; and a style editing subunit, configured to determine the third style sub-feature based on the first style sub-feature.

According to some embodiments, the content editing subunit is further configured to: replace the first content sub-feature with a product of the second content sub-feature and a first factor, where the first factor indicates a degree of consistency between content of the target image and the content of the reference image.

According to some embodiments, the style editing subunit is further configured to: use a product of the first style sub-feature and a second factor as the third style sub-feature, where the second factor indicates a degree of applying the style.

According to some embodiments, the extracting module includes: a first encoding unit, configured to encode the content description text to obtain a first text feature of the content description text; an introducing unit, configured to introduce information in the reference image into the style description text to obtain an extended style description text; and a second encoding unit, configured to encode the extended style description text to obtain a second text feature of the extended style description text, where the text feature includes the first text feature and the second text feature.

According to some embodiments, the extended style description text includes the style description text and a style description identifier of the reference image, and the second encoding unit includes: a first encoding subunit, configured to extract a first text sub-feature of the style description text by using a text encoder; a second encoding subunit, configured to extract a third image feature of the reference image by using an image encoder, where the image encoder and the text encoder are respectively configured to map an image and a text to a same feature space; and a determining subunit, configured to use the third image feature as a second text sub-feature of the style description identifier, where the second text feature includes the first text sub-feature and the second text sub-feature.

According to some embodiments, the reference image is any image frame in a reference video, and the second encoding subunit is further configured to: extract image features of one or more image frames in the reference video as the third image feature of the reference image by using the image encoder.

According to some embodiments, the attention editing unit includes: a first calculation subunit, configured to calculate a self-attention feature of the first image feature; a generation subunit, configured to generate a fourth image feature based on the self-attention feature and the first image feature; and a second calculation subunit, configured to calculate a first cross-attention feature of the fourth image feature and the text feature.

According to some embodiments, the reference image is any image frame in the reference video except the first image frame, and the generation subunit is further configured to: adjust the self-attention feature based on a historical self-attention feature corresponding to the self-attention feature to obtain an adjusted self-attention feature, where the historical self-attention feature is an attention feature that is obtained by performing style transfer on a historical image frame of the reference image by using the diffusion model and that is located at a same location as the self-attention feature; and generate the fourth image feature based on the adjusted self-attention feature and the first image feature.

It should be understood that the modules and units of the apparatus 400 shown in FIG. 4 may correspond to the steps in the method 200 described with reference to FIG. 2. Therefore, the operations, features, and advantages described above for the method 200 are also applicable to the apparatus 400 and the modules and units included in the apparatus. For the sake of brevity, some operations, features, and advantages are not described herein again.

Although specific functions are discussed above with reference to specific modules, it should be noted that the functions of the various modules discussed herein may be divided into a plurality of modules, and/or at least some functions of a plurality of modules may be combined into a single module.

It should be further understood that, various technologies may be described herein in the general context of software and hardware elements or program modules. The units described above with respect to FIG. 4 may be implemented in hardware or in hardware incorporating software and/or firmware. For example, these units may be implemented as computer program code/instructions configured to be executed in one or more processors and stored in a computer-readable storage medium. Alternatively, these units may be implemented as hardware logic/circuitry. For example, in some embodiments, one or more of the modules 410 to 430 may be implemented together in a system on chip (SoC). The SoC may include an integrated circuit chip (which includes a processor (e.g., a central processing unit (CPU), a microcontroller, a microprocessor, and a digital signal processor (DSP)), a memory, one or more communication interfaces, and/or one or more components in other circuits), and may optionally execute received program code and/or include embedded firmware to perform functions.

According to an embodiment of the present disclosure, an electronic device is further provided, including: at least one processor; and a memory communicatively connected to the at least one processor, where the memory stores instructions that can be executed by the at least one processor, and the instructions, when executed by the at least one processor, cause the at least one processor to perform the image style transfer method according to the embodiments of the present disclosure.

According to an embodiment of the present disclosure, a non-transitory computer-readable storage medium storing computer instructions is further provided. The computer instructions are used to cause a computer to perform the image style transfer method according to the embodiments of the present disclosure.

According to an embodiment of the present disclosure, a computer program product is further provided, including computer program instructions. When executed by a processor, the computer program instructions implement the image style transfer method according to the embodiments of the present disclosure.

Figure 5:
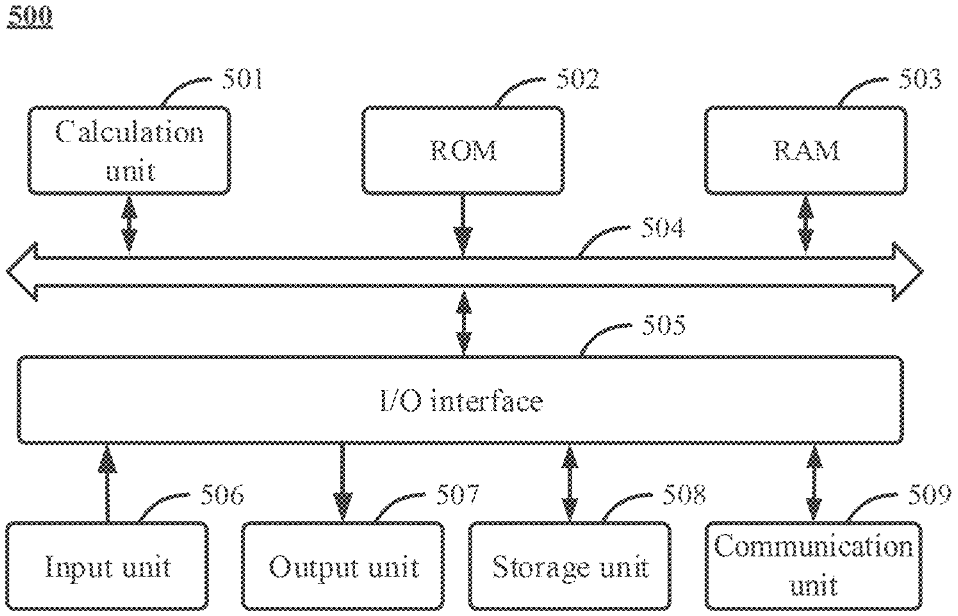
FIG. 5 is a block diagram of a structure of an example electronic device that can be configured to implement some embodiments of the present disclosure.

Referring to FIG. 5, a block diagram of a structure of an electronic device 500 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 5, the electronic device 500 includes a computing unit 501. The computing unit may perform various appropriate actions and processing according to a computer program stored in a read-only memory (ROM) 502 or a computer program loaded from a storage unit 508 to a random access memory (RAM) 503. The RAM 503 may further store various programs and data required for operations of the electronic device 500. The computing unit 501, the ROM 502, and the RAM 503 are connected to each other through a bus 504. An input/output (I/O) interface 505 is also connected to the bus 504.

A plurality of components in the electronic device 500 are connected to the I/O interface 505, including: an input unit 506, an output unit 507, the storage unit 508, and a communication unit 509. The input unit 506 may be any type of device capable of entering information to the electronic device 500. The input unit 506 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 507 may be any type of device capable of presenting information, and may include, but is not limited to, a display, a speaker, a video/audio output terminal, a vibrator, and/or a printer. The storage unit 508 may include, but is not limited to, a magnetic disk and an optical disk. The communication unit 509 allows the electronic device 500 to exchange information/data with other devices through a computer network such as the Internet and/or various telecommunication networks, and may include, but is not limited to, a modem, a network interface card, an infrared communication device, a wireless communication transceiver, and/or a chipset, for example, a Bluetooth device, an 802.11 device, a Wi-Fi device, a WiMax device, or a cellular communication device.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the method 200. For example, in some embodiments, the method 200 may be implemented as a computer software program, which is tangibly contained in a machine-readable medium, such as the storage unit 508. In some embodiments, a part or all of the computer program may be loaded and/or installed onto the electronic device 500 via the ROM 502 and/or the communication unit 509. When the computer program is loaded into the RAM 503 and executed by the computing unit 501, one or more steps of the method 200 described above can be performed. Alternatively, in other embodiments, the computing unit 501 may be configured, by any other appropriate means (for example, by means of firmware), to perform the method 200.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), the Internet, and a blockchain network.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be understood that the methods, systems and devices described above are merely embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method, comprising:

obtaining a reference image and a description text, wherein the description text comprises a content description text describing content of the reference image and a style description text describing a style of a target image to be generated;

extracting a text feature of the description text; and performing the following operations based on a pre-trained diffusion model to generate the target image:

in each time step of the diffusion model:

calculating a first cross-attention feature of a first image feature and the text feature;

obtaining a second cross-attention feature of a second image feature of the reference image and the text feature;

editing the first cross-attention feature based on the second cross-attention feature to obtain a third cross-attention feature; and generating a result image feature of the time step based on the third cross-attention feature and the text feature, wherein the first image feature in a first time step is an image feature of an initial image, and the first image feature in each of a second time step or a subsequent time step is the result image feature generated in a previous time step, the initial image being a random noise image or an image obtained by adding noise to the reference image; and decoding the result image feature of a last time step to generate the target image, wherein the first cross-attention feature comprises a first content sub-feature corresponding to the content description text and a first style sub-feature corresponding to the style description text, the second cross-attention feature comprises a second content sub-feature corresponding to the content description text and a second style sub-feature corresponding to the style description text, the third cross-attention feature comprises a third content sub-feature corresponding to the content description text and a third style sub-feature corresponding to the style description text, and wherein the editing the first cross-attention feature to obtain the third cross-attention feature comprises:

modifying the first content sub-feature based on the second content sub-feature to obtain the third content sub-feature; and determining the third style sub-feature based on the first style sub-feature.

2. The method according to claim 1, wherein the modifying the first content sub-feature comprises:

replacing the first content sub-feature with a product of the second content sub-feature and a first factor, wherein the first factor indicates a consistency degree between content of the target image and the content of the reference image.

3. The method according to claim 1, wherein the determining the third style sub-feature comprises:

determining a product of the first style sub-feature and a second factor as the third style sub-feature, wherein the second factor indicates a degree of applying the style.

4. The method according to claim 1, wherein the extracting the text feature of the description text comprises:

encoding the content description text to obtain a first text feature of the content description text;

introducing information of the reference image into the style description text to obtain an extended style description text; and encoding the extended style description text to obtain a second text feature of the extended style description text, wherein the text feature comprises the first text feature and the second text feature.

5. The method according to claim 4, wherein the extended style description text comprises the style description text and a style description identifier of the reference image, and wherein the encoding the extended style description text to obtain the second text feature of the extended style description text comprises:

extracting a first text sub-feature of the style description text by using a text encoder;

extracting a third image feature of the reference image by using an image encoder, wherein the image encoder and the text encoder are respectively configured to map an image and a text to a same feature space; and determining the third image feature as a second text sub-feature of the style description identifier, wherein the second text feature comprises the first text sub-feature and the second text sub-feature.

6. The method according to claim 5, wherein the reference image is any image frame in a reference video, and wherein the extracting the third image feature of the reference image by using the image encoder comprises:

extracting image feature of one or more image frames in the reference video as the third image feature of the reference image by using the image encoder.

7. The method according to claim 1, wherein the calculating the first cross-attention feature of the first image feature and the text feature comprises:

calculating a self-attention feature of the first image feature;

generating a fourth image feature based on the self-attention feature and the first image feature; and calculating a first cross-attention feature of the fourth image feature and the text feature.

8. The method according to claim 7, wherein the reference image is any image frame except a first image frame in a reference video, and wherein the generating the fourth image feature comprises:

adjusting the self-attention feature based on a historical self-attention feature corresponding to the self-attention feature to obtain an adjusted self-attention feature, wherein the historical self-attention feature is an attention feature obtained by performing style transfer on a historical image frame of the reference image by using the diffusion model and located at a same location as the self-attention feature; and generating the fourth image feature based on the adjusted self-attention feature and the first image feature.

9. An electronic device, comprising:

a processor; and a memory communicatively connected to the processor, wherein the memory stores instructions executable by the processor, and the instructions, when executed by the processor, cause the processor to perform operations comprising:

obtaining a reference image and a description text, wherein the description text comprises a content description text describing content of the reference image and a style description text describing a style of a target image to be generated;

extracting a text feature of the description text; and performing the following operations based on a pre-trained diffusion model to generate the target image:

in each time step of the diffusion model:

calculating a first cross-attention feature of a first image feature and the text feature;

obtaining a second cross-attention feature of a second image feature of the reference image and the text feature;

editing the first cross-attention feature based on the second cross-attention feature to obtain a third cross-attention feature; and generating a result image feature of the time step based on the third cross-attention feature and the text feature, wherein the first image feature in a first time step is an image feature of an initial image, and the first image feature in each of a second time step or a subsequent time step is the result image feature generated in a previous time step, the initial image being a random noise image or an image obtained by adding noise to the reference image; and decoding the result image feature of a last time step to generate the target image, wherein the first cross-attention feature comprises a first content sub-feature corresponding to the content description text and a first style sub-feature corresponding to the style description text, the second cross-attention feature comprises a second content sub-feature corresponding to the content description text and a second style sub-feature corresponding to the style description text, the third cross-attention feature comprises a third content sub-feature corresponding to the content description text and a third style sub-feature corresponding to the style description text, and wherein the editing the first cross-attention feature to obtain the third cross-attention feature comprises:

modifying the first content sub-feature based on the second content sub-feature to obtain the third content sub-feature; and determining the third style sub-feature based on the first style sub-feature.

10. The electronic device according to claim 9, wherein the modifying the first content sub-feature comprises:

replacing the first content sub-feature with a product of the second content sub-feature and a first factor, wherein the first factor indicates a consistency degree between content of the target image and the content of the reference image.

11. The electronic device according to claim 9, wherein the determining the third style sub-feature comprises:

determining a product of the first style sub-feature and a second factor as the third style sub-feature, wherein the second factor indicates a degree of applying the style.

12. The electronic device according to claim 9, wherein the extracting the text feature of the description text comprises:

encoding the content description text to obtain a first text feature of the content description text;

introducing information of the reference image into the style description text to obtain an extended style description text; and encoding the extended style description text to obtain a second text feature of the extended style description text, wherein the text feature comprises the first text feature and the second text feature.

13. The electronic device according to claim 12, wherein the extended style description text comprises the style description text and a style description identifier of the reference image, and wherein the encoding the extended style description text to obtain the second text feature of the extended style description text comprises:

extracting a first text sub-feature of the style description text by using a text encoder;

extracting a third image feature of the reference image by using an image encoder, wherein the image encoder and the text encoder are respectively configured to map an image and a text to a same feature space; and determining the third image feature as a second text sub-feature of the style description identifier, wherein the second text feature comprises the first text sub-feature and the second text sub-feature.

14. The electronic device according to claim 13, wherein the reference image is any image frame in a reference video, and wherein the extracting the third image feature of the reference image by using the image encoder comprises:

extracting image feature of one or more image frames in the reference video as the third image feature of the reference image by using the image encoder.

15. The electronic device according to claim 9, wherein the calculating the first cross-attention feature of the first image feature and the text feature comprises:

calculating a self-attention feature of the first image feature;

generating a fourth image feature based on the self-attention feature and the first image feature; and calculating a first cross-attention feature of the fourth image feature and the text feature.

16. The electronic device according to claim 15, wherein the reference image is any image frame except a first image frame in a reference video, and wherein the generating the fourth image feature comprises:

adjusting the self-attention feature based on a historical self-attention feature corresponding to the self-attention feature to obtain an adjusted self-attention feature, wherein the historical self-attention feature is an attention feature obtained by performing style transfer on a historical image frame of the reference image by using the diffusion model and located at a same location as the self-attention feature; and generating the fourth image feature based on the adjusted self-attention feature and the first image feature.

17. A non-transitory computer-readable storage medium storing computer instructions, wherein the computer instructions are configured to enable a computer to perform operations comprising:

obtaining a reference image and a description text, wherein the description text comprises a content description text describing content of the reference image and a style description text describing a style of a target image to be generated;

extracting a text feature of the description text; and performing the following operations based on a pre-trained diffusion model to generate the target image:

in each time step of the diffusion model:

calculating a first cross-attention feature of a first image feature and the text feature;

obtaining a second cross-attention feature of a second image feature of the reference image and the text feature;

editing the first cross-attention feature based on the second cross-attention feature to obtain a third cross-attention feature; and generating a result image feature of the time step based on the third cross-attention feature and the text feature, wherein the first image feature in a first time step is an image feature of an initial image, and the first image feature in each of a second time step or a subsequent time step is the result image feature generated in a previous time step, the initial image being a random noise image or an image obtained by adding noise to the reference image; and decoding the result image feature of a last time step to generate the target image, wherein the first cross-attention feature comprises a first content sub-feature corresponding to the content description text and a first style sub-feature corresponding to the style description text, the second cross-attention feature comprises a second content sub-feature corresponding to the content description text and a second style sub-feature corresponding to the style description text, the third cross-attention feature comprises a third content sub-feature corresponding to the content description text and a third style sub-feature corresponding to the style description text, and wherein the editing the first cross-attention feature to obtain the third cross-attention feature comprises:

modifying the first content sub-feature based on the second content sub-feature to obtain the third content sub-feature; and determining the third style sub-feature based on the first style sub-feature.

* * * * *